(12) United States Patent
Hayward et al.

(10) Patent No.: US 10,696,930 B2
(45) Date of Patent: Jun. 30, 2020

(54) SOLVENT CONTAINING ANITMICROBIAL HARD SURFACE CLEANING COMPOSITIONS

(71) Applicant: The Procter & Gamble Company, Cincinnati, OH (US)

(72) Inventors: Adam Simon Hayward, Durham (GB); Alan Edward Sherry, Newport, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/013,971

(22) Filed: Jun. 21, 2018

(65) Prior Publication Data

US 2018/0371376 A1 Dec. 27, 2018

Related U.S. Application Data

(60) Provisional application No. 62/522,805, filed on Jun. 21, 2017.

(30) Foreign Application Priority Data

Aug. 8, 2017 (EP) ..................................... 17185210
Apr. 20, 2018 (EP) ..................................... 18168431

(51) Int. Cl.

| C11D 3/48 | (2006.01) |
|---|---|
| C11D 3/32 | (2006.01) |
| C11D 3/43 | (2006.01) |
| C11D 3/20 | (2006.01) |
| C11D 1/14 | (2006.01) |
| C11D 1/83 | (2006.01) |
| A01N 37/18 | (2006.01) |
| A01N 59/00 | (2006.01) |
| C11D 1/75 | (2006.01) |

(52) U.S. Cl.
CPC ................ *C11D 3/48* (2013.01); *A01N 37/18* (2013.01); *A01N 59/00* (2013.01); *C11D 1/146* (2013.01); *C11D 1/83* (2013.01); *C11D 3/2044* (2013.01); *C11D 3/2048* (2013.01); *C11D 3/32* (2013.01); *C11D 3/43* (2013.01); *C11D 1/75* (2013.01)

(58) Field of Classification Search
None
See application file for complete search history.

(56) References Cited

U.S. PATENT DOCUMENTS

| 6,013,615 A | 1/2000 | Zhou et al. |
|---|---|---|
| 6,087,312 A | 7/2000 | Masotti et al. |
| 6,136,776 A | 10/2000 | Dickler et al. |
| 6,444,636 B1 | 9/2002 | Toussaint et al. |
| 6,448,214 B1 | 9/2002 | Del Duca et al. |
| 6,479,446 B1 | 11/2002 | Sherry et al. |
| 6,537,955 B1 | 3/2003 | Raso et al. |
| 6,642,197 B1 | 11/2003 | Cheung et al. |
| 6,667,289 B2 | 12/2003 | Harrison et al. |
| 6,699,825 B2 | 3/2004 | Rees et al. |
| 7,148,187 B1 | 12/2006 | Simon et al. |
| 8,648,027 B2 | 2/2014 | Mitchell et al. |
| 2003/0064910 A1 | 4/2003 | Fong et al. |
| 2003/0228991 A1 | 12/2003 | Johnson et al. |
| 2008/0251105 A1 | 10/2008 | Toussaint et al. |
| 2009/0117071 A1 | 5/2009 | Song |
| 2011/0224170 A1 | 9/2011 | Wagner et al. |
| 2011/0311600 A1 | 12/2011 | Polzin et al. |
| 2012/0295831 A1* | 11/2012 | Masters ............... C11D 3/0094 510/432 |
| 2014/0020711 A1* | 1/2014 | Kaser ....................... C11D 1/62 134/6 |
| 2017/0172145 A1 | 6/2017 | Sherry et al. |
| 2018/0371374 A1 | 12/2018 | Hayward |
| 2018/0371377 A1 | 12/2018 | Sherry |

FOREIGN PATENT DOCUMENTS

| EP | 0691397 A2 | 1/1996 |
|---|---|---|
| EP | 3101105 A1 | 12/2016 |
| GB | 2292562 A | 2/1996 |
| GB | 2318585 A | 4/1998 |
| GB | 2319179 A | 5/1998 |
| WO | WO9520024 A1 | 7/1995 |
| WO | WO9935227 A1 | 7/1999 |
| WO | WO0027981 A1 | 5/2000 |
| WO | WO2011075642 A1 | 6/2011 |
| WO | WO2013142474 A1 | 9/2013 |
| WO | WO2013162926 A1 | 10/2013 |
| WO | WO2014013234 A1 | 1/2014 |
| WO | WO2014163947 A1 | 10/2014 |

OTHER PUBLICATIONS

U.S. Appl. No. 16/013,974, filed Jun. 21, 2018, Hayward, et al.
U.S. Appl. No. 16/013,977, filed Jun. 21, 2018, Sherry, et al.
Extended European Search report; Application No. 18168431.7-1110; dated May 18, 2018; 9 pages.
Extended European Search Report; Application No. 17177171.0-1358; dated Sep. 27, 2017; 7 pages.
Extended European Search Report; Application No. 17185278.3-1105; dated Mar. 8, 2018; 8 pages.
Extended European Search Report; Application No. 17185218.9-1105; dated Mar. 23, 2018; 8 pages.

* cited by examiner

*Primary Examiner* — Katie L. Hammer
(74) *Attorney, Agent, or Firm* — John T. Dipre

(57) ABSTRACT

The need for a fast acting and broad spectrum antimicrobial composition which does not reduce surface shine and does not leave visible residues on the surface, which is also preferably suitable for surfaces which contact food, is met by formulating the antimicrobial composition according to the present invention.

9 Claims, No Drawings

SOLVENT CONTAINING ANITMICROBIAL HARD SURFACE CLEANING COMPOSITIONS

FIELD OF THE INVENTION

Fast acting, broad spectrum antimicrobial compositions which provide improved shine.

BACKGROUND OF THE INVENTION

Surfaces which are regularly contacted by organic matter, such as foodstuff, oils, sebum from skin contact, are often prone to contamination by microbes. Such surfaces are often treated or cleaned using antimicrobial compositions, in order to reduce or eliminate such microbes. To provide meaningful antimicrobial benefits, these antimicrobial compositions are ideally fast acting and ideally have broad spectrum activity. That is, efficacy over a broad range of microbes. In order to achieve fast acting, broad efficacy, antimicrobial compositions typically comprise high levels of antimicrobial actives. As such, they typically leave a residue which reduces surface shine and can give the impression that the surface has not been well cleaned. In addition, such compositions are often less suitable for use on surfaces that are in contact with food.

Therefore, a need remains for a fast acting and broad spectrum antimicrobial composition which does not reduce surface shine and does not leave visible residues on the surface, while also preferably being suitable for surfaces which contact food.

U.S. Pat. No. 8,648,027 B relates to a cleaning composition for sanitizing and/or disinfecting hard surfaces, comprising: a cationic biocide, surfactant and low levels of VOC solvents. GB2318585 A relates to an aqueous based cleaning compositions which include one or more quaternary amine compounds as disinfecting active agents, an organic solvent system which includes glycol mono-n-butyl ether or a binary system including a glycol ether with a linear primary alcohol, and either one or more betaines, or one or more amine oxides as a surfactant constituent. EP 0691397 A relates to an aqueous, antimicrobial hard surface cleaner comprising: a $C_{1-6}$ alkanol or $C_{3-24}$ alkylene glycol ether; surfactant selected from amphoteric, nonionic surfactants, and mixtures thereof; quaternary ammonium surfactant; builder; and water. GB 2353044 B relates to aaqueous based cleaning compositions which comprise a quaternary ammonium surfactant compound having germicidal properties; an amine oxide, a surfactant selected from carboxylates and N-acyl amino acid surfactants; a glycol ether solvent; an alcohol, an alkalizing agent such as an alkylamine; and water. WO 2017/112425 relates to compositions containing an amide, products incorporating the compositions, and methods of using the compositions and products. WO 99/35227 A relates to aqueous detergent compositions, preferably hard surface cleaning compositions, which contain alkyl aryl sulfonate surfactant, selected hydrophobic cleaning solvent, polycarboxylic acid, and aqueous solvent system in solution and/or a micellar phase, the pH being from about 2 to about 4. WO 99/19441 A1 relates to a cleaning and disinfecting composition, said composition comprising a surfactant system comprising from 0.01% to 10% by weight of an amine oxide, from 0.01% to 20% by weight of a short chain alkyl sulphate surfactant, and from 0.01% to 20% by weight of a long chain alkyl sulphate surfactant.

SUMMARY OF THE INVENTION

The present invention relates to an antimicrobial hard surface cleaning composition comprising: a detersive surfactant; an antimicrobial agent; an amide of formula I:

wherein R1 is selected from the group consisting of linear or branched, substituted or unsubstituted C6-C12, each of R2 and R3 is independently selected from H, OH, a halogen, or C1-C6 linear or branched, substituted or unsubstituted hydrocarbyl groups; a glycol solvent, wherein the glycol solvent is selected from the group consisting of $C_1$-$C_6$ diols, $C_1$-$C_6$ triols, and mixtures thereof, preferably propylene glycol, dipropylene glycol, glycerin, 1,3 butylene glycol, ethylene glycol, diethylene glycol, triethylene glycol and mixtures thereof, more preferably propylene glycol; water; and said composition has a pH from 1.0 to 6.0.

The present invention further relates to a method for cleaning a hard surface, comprising the steps of: optionally diluting the hard surface cleaning composition; applying the hard surface cleaning composition to a hard surface; leaving the hard surface to dry without rinsing the surface. The present invention further relates to the use of a glycol solvent in an acidic antimicrobial composition to reduce surface streaks and/or improve surface shine.

DETAILED DESCRIPTION OF THE INVENTION

Hard surface cleaning compositions of the present invention, comprising a detergent surfactant, an antimicrobial agent, and a glycol provide improved surface shine.

Glycols have low chemical reactivity and so are unlikely to interfere with the actives of the antimicrobial composition. The glycols have been found to provide shine improvements by changing the physical pattern of composition residues after application to the surface. It is believed that the glycol reduces the size of the crystals formed by the product residues on the surface upon drying to a particle size that is not visible to the naked eye, and which results in less scattering of incident light. As such, the compositions of the present invention reduce surface streaks and/or improve surface shine when treating the surface with the antimicrobial hard surface cleaning composition. They are also typically suitable for use on surfaces which contact food. Furthermore, such glycols can provide additional benefits alongside shine improvements, such as grease cleaning.

As defined herein, "essentially free of" a component means that no amount of that component is deliberately incorporated into the respective premix, or composition. Preferably, "essentially free of" a component means that no amount of that component is present in the respective premix, or composition.

As defined herein, "stable" means that no visible phase separation is observed for a premix kept at 25° C. for a period of at least two weeks, or at least four weeks, or greater than a month or greater than four months.

All percentages, ratios and proportions used herein are by weight percent of the composition, unless otherwise specified. All average values are calculated "by weight" of the composition, unless otherwise expressly indicated. All ratios are calculated as a weight/weight level, unless otherwise specified.

All measurements are performed at 25° C. unless otherwise specified.

Unless otherwise noted, all component or composition levels are in reference to the active portion of that component or composition, and are exclusive of impurities, for example, residual solvents or by-products, which may be present in commercially available sources of such components or compositions.

Antimicrobial Hard Surface Cleaning Compositions:

By "hard surface cleaning composition", it is meant herein a composition for cleaning hard surfaces found in households, especially domestic households. Surfaces to be cleaned include kitchens and bathrooms, e.g., floors, walls, tiles, windows, cupboards, sinks, showers, shower plastified curtains, wash basins, WCs, fixtures and fittings and the like made of different materials like ceramic, vinyl, no-wax vinyl, linoleum, melamine, glass, steel, kitchen work surfaces, any plastics, plastified wood, metal or any painted or varnished or sealed surface and the like. Household hard surfaces also include household appliances including, but not limited to refrigerators, freezers, washing machines, automatic dryers, ovens, microwave ovens, dishwashers and so on. Such hard surfaces may be found both in private households as well as in commercial, institutional and industrial environments. The hard surface cleaning composition is preferably a liquid hard surface cleaning composition.

In a preferred embodiment, the liquid compositions herein are aqueous compositions, comprising at least 10% by weight of water. Therefore, they may comprise from 30% to 99.5% by weight of the total composition of water, preferably from 50% to 98% and more preferably from 80% to 97%.

The compositions of the present invention preferably have a viscosity of from 50 Pa.s to 1200 Pa.s, more preferably 100 Pa.s to 800Pa.s, most preferably 200 Pa.s to 600 Pa.s when measured at 20° C. with a AD1000 Advanced Rheometer from Atlas® shear rate $10\ s^{-1}$ with a coned spindle of 40 mm with a cone angle 2° and a truncation of ±60 μm.

The composition has a pH from 1.0 to 6.0, or from 1.0 to 5.5, or from 1.0 to 5.0, or from 2.5 to 5.0. The compositions disclosed herein may comprise an acidifying agent. The acidifying agent may be present to provide buffering capacity. The acidifying agent may also sequester transition metals, including iron, copper, manganese and the like. The acidifying agent may be chosen to further enhance the antimicrobial activity of the composition. The acidifying agent may be a US EPA/Health Canada registered active or a European notified antimicrobial substance.

Suitable acidifying agents may be selected from the group consisting of: organic acid, inorganic acid, and mixtures thereof. Suitable inorganic acids include phosphoric acid, sulphuric acid, urea-sulphuric acid, hydrochloric acid, sulphamic acid, methyl sulphuric acid, hypochlorous acid, sodium bisulphate (sodium hydrogen sulphate), and the like. Suitable organic acids include polymeric acids comprising at least 3 carboxylic acid groups, $C_1$-$C_{11}$ organic acids comprising at least one carboxylic acid group, and organic acids that do not comprise carboxylic acid functional groups (such as imidazole derivatives or phenolic or polyphenolic compounds). Non-limiting examples of polymeric acids include polymers of acrylic acid, methacrylic acid, maleic acid, or itaconic acid or copolymers of acrylic acid, methacrylic acid, maleic acid, itaconic acid, and mixtures thereof. Polymeric acids may be homopolymers or copolymers having a molecular weight of 500 g/mol or greater. The polymeric acid may have a molecular weight ranging from 500 g/mol to about 1,000,000 g/mol, or from 500 g/mol to 100,000 g/mol, or from about 1,000 g/mol to 20,000 g/mol. Copolymers may be random copolymers or block copolymers. In addition to monomer units comprising carboxylic acid groups, the copolymers may also include one or more other monomers, such as styrene, acrylic ester, acrylamide, olefin sulphonate, and olefin acetate.

Non-limiting examples of $C_1$-$C_{11}$ organic acids include formic acid, acetic acid, benzoic acid, malonic acid, citric acid, maleic acid, fumaric acid, succinic acid, lactic acid, malic acid, tartaric acid, gluconic acid, glutaric acid, adipic acid, 2-ethyl-1-hexanoic acid, heptanoic acid, octanoic acid, nonanoic acid, undecylenic acid, butane tetracarboxylic acid, and the like. The organic acid may be derived from a renewable, plant-based feedstock and produced using natural processes, such as fermentation; examples include bio-based acetic acid, bio-based citric acid, bio-based lactic acid and bio-based succinic acid, and the like. The organic acid may have food-use pedigree or be Generally Regarded As Safe (GRAS) or a food additive by the US Food & Drug Administration.

The acidifying agent can be selected from the group consisting of: formic acid, acetic acid, benzoic acid, malonic acid, citric acid, maleic acid, fumaric acid, hypochlorous acid, succinic acid, gluconic acid, glutaric acid, lactic acid, 2-ethyl-1-hexanoic acid, octanoic acid, nonanoic acid, peracetic acid, peroctanoic acid, undecylenic acid, and mixtures thereof, or from the group consisting of: benzoic acid, citric acid, lactic acid succinic acid, maleic acid, succinic acid, octanoic acid, and mixtures thereof.

The composition may comprise from 0.01% to 40%, or from 0.03% to 25%, or from 0.5% to 15.0%, or from 1.0% to 8.0%, or from 2.0% to 6.0% by weight of the acidifying agent. An increased concentration of acidifying agent increases the composition's reserve buffering capacity, which reduces pH fluctuation upon dilution. Partial neutralization of the acidifying agent to a pH value just below its pKa (e.g., 0.1 to 0.5 pH units below the acidifying agent's pKa) may also help to reduce pH fluctuation upon dilution. A concentrate may therefore be formulated at an increased pH, which may lead to an improved overall safety profile without compromising in-use (diluted) antimicrobial performance.

A ready-to-use composition, such as compositions comprised within spray containers, may comprise from 0.01% to 1.0%, or from 0.1% to 0.8%, or from 0.2% to 0.6% by weight of the acidifying agent.

The weight ratio of surfactant to acidifying agent in the composition may be from about 50:1 to about 1:50, or from about 10:1 to about 1:10, or from about 5:1 to about 1:5, or from about 3:1 to about 1:3.

The acidifying agent may be chosen to potentiate or provide antimicrobial properties. Such acidifying agents may be selected from the group consisting of benzoic acid, citric acid, succinic acid, glycolic acid, lactic acid, octanoic acid, hypochlorous acid, peroxyacetic acid, peroxyoctanoic acid, and mixtures thereof. Acids characterized by reduced water solubility, including succinic acid, benzoic acid, cinnamic acid and octanoic acid, may be especially beneficial. A combination of succinic acid and octanoic acid is particularly beneficial for improving antimicrobial properties.

A suitable base to be used herein is an organic and/or inorganic base. Suitable bases for use herein are the caustic alkalis, such as sodium hydroxide, potassium hydroxide and/or lithium hydroxide, and/or the alkali metal oxides such, as sodium and/or potassium oxide and mixtures thereof. A preferred base is a caustic alkali, more preferably sodium hydroxide and/or potassium hydroxide.

Other suitable bases include ammonia, ammonium carbonate, $K_2CO_3$, $Na_2CO_3$ and alkanolamines (such as monoethanolamine, triethanolamine, aminomethylpropanol, and mixtures thereof).

Typical levels of such bases, when present, are from 0.01% to 5.0% by weight of the total composition, preferably from 0.03% to 3.0% and more preferably from 0.05% to 1.0%.

The present hard surface cleaning compositions have improved transparency, and thus reduced haziness. Preferably, the hard surface cleaning compositions have a % haze of from 0 to 15, more preferably 0 to 7, most preferably 0 to 5.

Detersive Surfactant:

The compositions of the present invention comprise a detersive surfactant. Suitable surfactants can be selected from the group consisting of an anionic surfactant, a cationic surfactant, a nonionic surfactant, an amphoteric surfactant, a zwitterionic surfactant, and mixtures thereof. Suitable surfactants may be branched or linear, saturated or unsaturated. The surfactant may comprise from 6 to 12 carbon atoms, or from 6 to 11 carbon atoms, or from about 6 to about 10 carbon atoms, or from 8 to 10 carbon atoms, in the primary carbon chain. The "primary carbon chain" denotes the longest carbon-based chain that is uninterrupted by a heteroatom, such as O, S, N and P. For example, n-octyl sulphate has 8 carbon atoms in the primary carbon chain, 2-propyl-1-heptyl sulphate has 7 carbon atoms in the primary carbon chain, and dodecyl methyl ester sulphonate ($C_{10}H_{21}$—CH($SO_3^-$)—C(O)O—$CH_3$) has 11 carbon atoms in the primary carbon chain. In the context of branched surfactants, $C_n$ (such as $C_1$ or $C_8$) refers to the number of carbon atoms in the primary carbon chain (for example, a 2-ethyl-1-hexyl primary carbon chain is $C_6$). In the context of linear (or unbranched) surfactants, $C_n$ (such as $C_1$ or $C_8$) refers to the total number of carbon atoms in the surfactant.

Without being bound by theory, it is believed that the short chain-length of the surfactant is particularly beneficial for antimicrobial applications involving shorter contact times between the microorganism and the composition, for example, from 10 seconds to 3 minutes or from 15 seconds to 2 minutes, or from 30 seconds to 1 minute. The short chain-length of the surfactant is believed to enhance the activity of antimicrobial active(s) in the composition. The short chain-length of the surfactant is also believed to improve the solubility of the amide in aqueous compositions. Critical Micelle Concentration (CMC) measurements in the presence and absence of the amide indicate that the surfactants disclosed herein enhance the solubility of the amide by incorporating the amide into the micellar structure(s) of the surfactant. The chain-length of the surfactant and the chain-length of the amide may be matched, for example, where the difference between the chain-length of the surfactant and the chain-length of the amide is 2 to 3 carbon atoms, to provide a combination of increased solubility of the amide in the composition and increased antimicrobial activity of the composition.

Suitable anionic surfactants can be selected from: alkyl sulphonates, ether sulphonates, alkyl sulphates, alkyl sulphates, alkyl ether sulphates, alkyl and/or alkenyl succinates, carboxylates (such as alkyl ethoxy carboxylates), and mixtures thereof. Suitable anionic surfactants include: sodium, potassium, ammonium, alkanol-ammonium magnesium and calcium salts of $C_8$-$C_{10}$ glyceryl ether sulphonates, $C_8$ alkyl sulphonates, $C_2$-$C_8$ linear alkyl benzene sulphonate, $C_6$-$C_{12}$ alkyl sulphates, $C_8$-$C_{12}$ alkyl ether sulphates, $C_{5-10}$ alkyl and alkenyl succinates as mono or dianionic surfactants [e.g., R—CH($COO^-$ $M^+$)—$CH_2$—$COO^-$ $M^+$, R—CH($COO^-$—$M^+$)—$CH_2$—$COOH^-$ and R—CH($COOH$)—$CH_2$—$COO^-M^+$ wherein R=$C_{5-10}$ linear or branched alkyl or alkenyl group and M=lithium, sodium, potassium, ammonium or alkanol-ammonium, and mixtures thereof], $C_8$-$C_{12}$ methyl ester sulphonates, $C_8$-$C_{12}$ fatty acid sulphonates and $C_6$-$C_{12}$ carboxylates, and mixtures thereof. The anionic surfactant can be selected from the group consisting of: sodium octyl sulphate, sodium decyl sulphate, sodium octyl glyceryl ether sulphonate ($C_8H_{17}$—O—$CH_2$—CH(OH)—$CH_2SO_3Na$), the sodium salt of 2-propyl-1-heptyl sulphate, the sodium salts of $C_{9-11}$ secondary sulphates, the sodium salts of $C_{12}$ methyl ester sulphonate and $C_{12}$ fatty acid sulphonate, and mixtures thereof, preferably from the group consisting of: octyl sulphate, sodium decyl sulphate, and mixtures thereof. The anionic surfactant may be derived from a renewable feedstock.

Suitable nonionic surfactants include linear or branched, saturated or unsaturated alcohol alkoxylates, alkyl glycosides, and mixtures thereof. The nonionic surfactant can be selected from the group consisting of: $C_{6-12}$ alcohol ethoxylate comprising an average of from 1 mole to 7 moles of ethylene oxide, $C_{6-12}$ alcohol ethoxy propoxylate comprising an average of from 1 mole to 7 moles of ethylene oxide and from 1 mole to 4 moles of propylene oxide, $C_8$ pyrrolidone, $C_8$ and $C_{8-10}$ alkyl polyglucoside with a degree of glucoside polymerization of from 1 to 1.6, $C_{8-10}$ alkyl polypentoside (e.g., xyloside and riboside) with a degree of sugar pentoside polymerization of from 1 to 1.6, and mixtures thereof, or selected from the group consisting of: octyl alkylpolyglycoside, decyl alkylpolyglycoside, octyl pyrrolidone, and mixtures thereof. The nonionic surfactant may be derived from a renewable feedstock.

Suitable cationic surfactants include saturated or unsaturated betaines, amine oxides, alkyl morpholinium compounds, alkyl trimethyl ammonium compounds, and mixtures thereof. The cationic surfactant can be selected from the group consisting of: n-octyl dimethyl amine oxide, n-octyl dimethyl betaine, n-octyl amidopropyl betaine, and mixtures thereof. At the pH of the composition, amine oxide surfactants are protonated and hence in their cationic form. The cationic surfactant may be derived from a renewable feedstock.

Suitable amine oxide surfactants include: $R_1R_2R_3NO$ wherein each of $R_1$, $R_2$ and $R_3$ is independently a saturated or unsaturated, substituted or unsubstituted, linear or branched hydrocarbon chain having from 1 to 30 carbon atoms. Preferred amine oxide surfactants are amine oxides having the following formula: $R_1R_2R_3NO$ wherein R1 is a hydrocarbon chain comprising from 1 to 30 carbon atoms, preferably from 6 to 20, more preferably from 8 to 16 and wherein $R_2$ and $R_3$ are independently saturated or unsaturated, substituted or unsubstituted, linear or branched hydrocarbon chains comprising from 1 to 4 carbon atoms, preferably from 1 to 3 carbon atoms, and more preferably are methyl groups. R1 may be a saturated or unsaturated, substituted or unsubstituted linear or branched hydrocarbon chain. The amine oxide surfactant can be present at a level of from 0.01% to 9.5%, preferably from 0.01% to 2.0%, more preferably from 0.05% to 1.0% by weight of the composition.

Highly preferred amine oxides are C8 dimethyl amine oxide, C10 dimethyl amine oxide, and $C_{12}$-$C_{14}$ dimethyl amine oxide. C8 dimethyl amine oxide is commercially available under the trade name Genaminox® OC from Clariant, C10 dimethyl amine oxide is commercially available under the trade name Genaminox® K-10 from Clariant, $C_{12}$-$C_{14}$ dimethyl amine oxide is commercially available from Albright & Wilson, and under the trade name Genaminox® LA from Clariant or AROMOX® DMC from AKZO Nobel.

Suitable zwitterionic surfactants include 2-ethyl-1-hexyl imino dipropionate as well as n-dodecyl imino dipropionate (mono- and dianionic salts), $C_{6-12}$ amphoglycinates, and $C_{6-12}$ alkyl sulphobetaines, such as the sodium salt of n-octyl, n-decyl, or n-dodecyl N,N-dimethyl-3-ammonio-1-propanesulphonate.

The composition may comprise surfactant selected from the group consisting of $C_8$ glyceryl ether sulphonate, $C_6$-$C_{12}$ alkyl sulphate, $C_8$-$C_{12}$ methyl ester sulphonate, $C_8$-$C_{12}$ fatty acid sulphonate, $C_6$-$C_{12}$ ether carboxylate, $C_{8-10}$ amine dimethyl oxide, $C_8$ pyrrolidone, $C_8$ dimethyl betaine, $C_{8-10}$ alkyl polyglucoside, $C_{8-12}$ N,N-dimethyl-3-ammonio-1-propanesulphonate, and mixtures thereof.

The compositions may comprise from 0.01% to 20%, or from 0.03% to 10%, or from 0.10% to 1.5%, or 0.12% to 1.0% by weight of surfactant.

The compositions may comprise from 0.01% to 20%, or from 2.0% to 15%, or 3.0% to 10% by weight of surfactant. Such compositions are generally intended to be diluted prior to use.

A ready-to-use antimicrobial composition, for instance, for use with spray containers, may comprise from 0.01% to 3.0%, or from 0.10% to 1.5%, or from 0.12% to 1.0% by weight of surfactant.

The composition may further comprise one or more $C_{13-18}$ surfactants. When $C_{13-18}$ surfactant is present in the composition, the weight ratio of $C_{6-12}$ surfactant to $C_{13-18}$ surfactant may be greater than about 2:1, or greater than about 3:1. The average chain-length of the surfactant in the composition(s) may be less than $C_{12}$, or less than $C_{11}$. The surfactant in the composition may have an average chain-length of from $C_7$ to $C_8$, or from $C_8$ to $C_9$, or from $C_9$ to $C_{10}$, or from $C_{10}$ to $C_{11}$. The composition(s) may comprise surfactant having an average chain-length of about $C_8$. The solubility of the amide may be further increased by utilizing $C_{13-18}$ surfactants.

Commercial surfactants can be a blend of molecules having different alkyl chain lengths (though it is possible to obtain single chain-length cuts). For instance, Polystep® B-25 (from the Stepan Company) is described as sodium decyl sulphate but also contains about 25%-30% dodecyl sulphate, by weight of the alkyl sulphate surfactant. Similarly, many commercial lauryl surfactants may include up to 30% or more surfactant having chain-length(s) greater than Cie.

The critical micelle concentration (CMC) of the composition may be from 100 ppm to 2,500 ppm, or from 200 ppm to 2,000 ppm, or from 300 ppm to 1,500 ppm.

Antimicrobial Agent:

Suitable antimicrobial agents include antimicrobial agents selected from the group consisting of: ionic silver, an active oxygen source, and mixtures thereof, preferably an active oxygen source.

In the cleaning compositions according to the invention, the antimicrobial agent should be be present in amounts which are effective in exhibiting satisfactory germicidal activity—against selected bacteria sought to be treated by the cleaning compositions. Such efficacy may be achieved against less resistant bacterial strains with only minor amounts of the antimicrobial agent being present, while more resistant strains of bacteria require greater amounts of the antimicrobial agent in order to destroy these more resistant strains.

A germicidally effective amount of the antimicrobial agent can be considered to result in at least a log 4.5, preferably at least a log 5 reduction of Staphylococcus aureus, using the method of EN1276 (Chemical Disinfectants Bactericidal Activity Testing), in less than 3 minutes.

Any suitable ionic silver can be used as the antimicrobial agent. As used herein, "ionic silver," refers to any silver (I) compound that may be solubilized or dispersed in an aqueous medium, preferably at a pH ranging from 1.0 to 6.0. Examples of ionic silver include silver acetate, silver lactate, silver nitrate, silver dihydrogen citrate, silver sulphate, silver citrate, as well as complexes of silver I formed with ammonia. The composition may comprise from 0.001%, or from 0.002%, or from 0.003%, or from 0.005% to 0.25%, or to 0.3%, or to 0.5%, or to 2% of ionic silver by weight of the composition. The concentration of ionic silver is calculated as the weight percent of silver present in an ionic silver compound. For example, the weight percent of ionic silver in a composition comprising 0.1% silver nitrate is 0.064% [0.1%*(107.9/169.9)] and the weight percent of silver in a composition comprising 0.1% silver dihydrogen citrate is 0.036% [0.1%*107.9/300.0].

Compositions comprising ionic silver may be substantially free of chloride ion, iodide ion, and/or bromide ion impurities; the compositions may comprise less than 10 ppm chloride ion, less than 10 ppm iodide ion, less than 10 ppm bromide ion, or less than 10 ppm of a mixture thereof, or less than 1 ppm chloride ion, less than 1 ppm iodide ion, less than 1 ppm bromide ion, or less than 1 ppm of a mixture thereof.

The composition(s) disclosed herein may comprise from 0.002% to 0.5% of antimicrobial active, where the antimicrobial active comprises ionic silver. The composition(s) disclosed herein may comprise from 0.002% to 0.5% of antimicrobial active, where the antimicrobial active comprises ionic silver selected from the group consisting of silver nitrate, silver dihydrogen citrate, silver acetate, silver sulphate, and mixtures thereof. The composition(s) disclosed herein may comprise amide of formula I and antimicrobial active, where the antimicrobial active comprises hydrogen peroxide, and in the amide of formula I, $R^1$ is selected from the group consisting of linear or branched, substituted or unsubstituted $C_6$-$C_{10}$ hydrocarbyl groups, wherein the weight ratio of hydrogen peroxide to the amide of formula I is from 0.2:1 to 5:1.

The composition may comprise an active oxygen source as a suitable antimicrobial agent. Suitable active oxygen sources include hydrogen peroxide, peroxyacids, organic peroxides and mixtures thereof. The active oxygen source can be present at a level of from 0.05% to 8%, or from 0.1% to 6%, or 0.2% to 5% by weight of the composition.

The peroxyacid can be preformed, or formed in-situ. For instance, the peroxyacids can be preformed in situ via the reaction of a carboxylic acid-containing acidifying agent and hydrogen peroxide. Suitable carboxylic acid-containing acidifying agent include: formic acid, acetic acid, benzoic acid, malonic acid, citric acid, maleic acid, fumaric acid, hypochlorous acid, succinic acid, gluconic acid, glutaric acid, lactic acid, 2-ethyl-1-hexanoic acid, cinnamic acid, heptanoic acid, octanoic acid, nonanoic acid, peracetic acid, peroctanoic acid, undecylenic acid, and mixtures thereof. For instance, octanoic acid or nonanoic acid can be used to form peroxyoctanoic acid or peroxynonanoic acid, respectively. The rate of formation of the peracid can depend on the pH of the composition (reduced pH favors peracid formation and faster rates of formation). The weight ratio of hydrogen peroxide to acidifying agent can be from 0.1:1 to 10:1, or from 0.2:1 to 5:1, or from 0.5:1 to 2:1.

The compositions may alternatively comprise hydrogen peroxide and be substantially free of $C_{6-12}$ peracids. Alternatively, the compositions may comprise catalytic amounts of peracid, for instance, from 1 ppm to 50 ppm, or 1 ppm to 10 ppm of the peracid.

The composition may comprise from 0.05% to 8%, or from 0.1% to 6%, or 0.2% to 5% by weight of the composition of hydrogen peroxide.

Compositions comprising hydrogen peroxide should comprise less than 5 ppm transition metal ion impurities, or less than 2 ppm transition metal ion impurities, or less than 0.5 ppm transition metal ion impurities. Compositions comprising hydrogen peroxide may comprise less than 5 ppm ferrous ion, less than 5 ppm ferric ion, or less than 5 ppm of a mixture thereof, or less than 1 ppm ferrous ion, less than 1 ppm ferric ion, or less than 1 ppm of a mixture thereof, or less than 0.1 ppm ferrous ion, less than 0.1 ppm ferric ion, or less than 0.1 ppm of a mixture thereof.

The combination of acid and hydrogen peroxide may generate measurable concentrations of peracid, from the reaction of acid and hydrogen peroxide.

The composition may be substantially free of trace transition metal impurities.

The Glycol Solvent:

The solvents used in this invention are glycol solvents, which are generally liquid at ambient temperature. Said solvents are employed to provide shine improvements to the antimicrobial compositions, however said solvents may also be selected to provide secondary benefits in addition to shine, such as improved grease cleaning, formula stability, suds control, composition viscosity or provide additional antimicrobial potentiation. The glycol solvent is a compound that comprises at least 2 hydroxyl (—OH) groups covalently bonded to one or more carbon atoms within the same molecule. Suitable glycol solvents include germinal diols (two hydroxyl groups on the same carbon atom), vicinal diols (at least two hydroxyl groups are on adjacent carbon atoms), and distant diols (two hydroxyl groups are separated by more than one carbon atom). Examples of geminal diols include dihydroxyacetone, decahydroxy cyclopentane and the like; examples of vicinal diols include propylene glycol, glycerin, 1,2-dihydroxy benzene (catechol) and the like; examples of distant glycols include 1,3-butanediol, 1,3-dihydroxybenzene (resorcinol) and the like. Glycol solvents of use in the invention may be pre-made (e.g., propylene glycol) prior to incorporation into the aqueous compositions of the invention, or may be formed in situ (e.g., dihydroxyacetone) within the compositions of the invention. The glycol solvent can be selected from the group consisting of $C_1$-$C_6$ diols, and $C_1$-$C_6$ triols. The glycol solvents of use in the invention act as solvents within the compositions in which they are included, but may be liquids or solids at room temperature. The glycol solvent preferably comprises less than 20 carbon atoms, more preferably less than 16 carbon atoms, more preferably less than 12 carbon atoms, and most preferably less than 9 carbon atoms. Propylene glycol is particularly preferred.

The glycol solvent can be present at a level of from 0.01% to 10%, preferably from 0.05% to 5.0%, more preferably from 0.1% to 1.0%, most preferably from 0.2% to 0.5%. The glycol solvent is preferably selected from those solvents that are approved for use in products designed for cleaning or sanitizing food-contact surfaces, as defined by United States Environmental Protection Agency. The solvent may also be chosen to be non-VOC (Volatile Organic Compound), or VOC (e.g. propylene glycol). A VOC solvent may be present at a concentration of less than about 0.5% by weight of the ready-to-use composition.

Without being bound by theory, it is believed that glycol solvents improve the wetting of the antimicrobial composition across the surface during application. Consequently, the composition is more effectively dispersed across the surface, resulting in smaller crystal residues upon drying and therefore improved visual shine performance.

Amide:

The compositions disclosed herein may comprise an amide of formula I,

$$R^1\text{—CO—NR}^2R^3 \qquad (I)$$

where $R^1$ is selected from the group consisting of linear or branched, substituted or unsubstituted $C_6$-$C_{12}$, or $C_6$-$C_{10}$ hydrocarbyl groups, each of $R^2$ and $R^3$ is independently selected from H, OH, a halogen, or $C_1$-$C_6$ linear or branched, substituted or unsubstituted hydrocarbyl groups.

Such amides provide improved soil removal, especially grease cleaning, but can also potentiate the antimicrobial efficacy of antimicrobial agents, such as hydrogen peroxides, sources of hydrogen peroxide, and ionic silver. However, such amides reduce surface shine since they leave a hazy residue on surfaces when used in compositions not comprising the glycol solvent.

It is believed that the amides disclosed herein potentiate the activity of antimicrobial actives against a variety of microorganisms, including Gram-positive bacteria, Gram-negative bacteria, non-enveloped viruses, fungi, mycobacteria, and even spore-forming organisms, such as *Clostridium difficile* spores, even though the amides alone typically do not exhibit antimicrobial efficacy.

The amide is present at a level of from 0.01% to 15.0%, preferably from 0.1% to 10.0%, more preferably from 0.1% to 2.0%, most preferably from 0.12% to 0.6% by weight of the composition. A concentrated antimicrobial composition may comprise from 3.0% to 15.0%, from 3.0% to 8.0%, from 3.0% to 6.0% by weight of an amide of formula I. A ready-to-use composition may comprise from 0.01% to 1.0%, or from 0.1% to 0.8%, or from 0.12% to 0.6%, weight of an amide of formula I.

The weight ratio of surfactant to amide of formula I may be from 0.05:1 to 10:1, or from 0.1:1 to 5:1, or from 0.2:1 to 5:1, or from 0.25:1 to 5:1.

Suitable amides of formula I include monounsaturated amides, saturated amides, and hydroxamic acids. Non-limiting examples of amides of formula I include n-octanamide, N-hexyl-N-methyl decanamide, N,N-diethanol octanamide, N,N-dimethyl decanamide, N,N-dimethyl 9-decenamide, N.N-dimethyl 7-octenamide, N,N-dibutyl hexanamide, octanohydroxamic acid, and N,N-diethanol dodecanamide, and mixtures thereof.

$C_{6-12}$ hydroxamic acids, such as octanohydroxamic, may also provide chelation. For example, octanohydroxamic acid is known to have transition metal chelation properties, especially with respect to iron cations. As such, octanohydroxamic acid may be used, as a chelator, in combination with another amide of formula I. Combinations of $C_{6-12}$ hydroxamic acid or $C_{6-10}$ hydroxamic acid and another amide of formula I may be beneficial in promoting enhanced antimicrobial activity.

Commercially available amides of formula I include Genagen 4296®, an N,N-dimethyl decanamide available from Clariant, Steposol® MET 10U, a N,N-dimethyl 9-decenamide available from Stepan Company, Cola®Mid AL, a lauric acid N,N-diethanol amide available from Colonial Chemical, and octanohydroxamic acid available from TCI America. Additionally, Steposol® M-8-10 is a mixture comprising approximately 55-60% N,N-dimethyl octanamide and approximately 40-45% N,N-dimethyl decanamide, which is derived from coconut oil and available from the Stepan Company.

Polymer:

The antimicrobial hard surface cleaning composition may comprise a polymer. The polymer can improve grease cleaning, and/or improve the efficacy of the antimicrobial agent. The presence of such polymers has been found to detrimentally affect the surface shine of the treated surface. However, the glycol solvents, as described herein, are particularly effective at promoting the deposition of such polymers as a homogeneous film, thereby reducing their impact on surface shine.

Oxazoline homopolymers and copolymers have been found to be particularly effective at improving the efficacy of antimicrobial agents, particularly residual antimicrobial efficacy.

Suitable oxazoline homopolymers can have the formula:

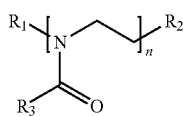

(A)

wherein in formula (A):

$R_1$ is a hydrogen, alkyl, alkenyl, alkoxy, alkylamino, alkynyl, allyl, amino, anilino, aryl, benzyl, carboxyl, arboxyalkyl,carboxyalkenyl, cyano, glycosyl, halo, hydroxyl, oxazolinium mesylate, oxazolinium tosylate, oxazolinium triflate, silyl oxazolinium, phenolic, polyalkoxy, quaternary ammonium, thiol, or thioether group;

$R_2$ is a hydrogen, alkyl, alkenyl, alkoxy, alkylamino, alkynyl, allyl, amino, anilino, aryl, benzyl, carboxyl, carboxyalkyl, carboxyalkyl, cyano, glycosyl, halo, hydroxyl, oxazolinium mesylate, oxazolinium tosylate, oxazolinium triflate, silyl oxazolinium, phenolic, polyalkoxy, quaternary ammonium, thiol, or thioether group, or a macrocyclic structure;

$R_3$ is a hydrogen, alkyl, alkenyl, alkoxy, aryl, benzyl, hydroxyalkyl, or perfluoroalkyl group; and n is in the range of from 1 to 1,000,000.

Suitable oxazoline homopolymers are described in US 2016/0262383 A1.

Suitable oxazoline copolymers can be derived from a monomer mixture comprising monomers having the formulas:

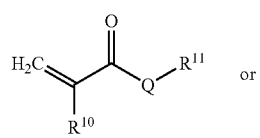 or (B)

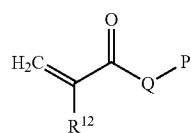

(C)

wherein:

Q is O or N;
$R^{10}$ is H or $CH_3$;
$R^{11}$ is an organic group comprising a hydrolysable silyl group;
$R^{12}$ is H or $CH_3$; and
P is

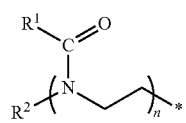

(C)

wherein in formula (C):

$R^1$ is selected from H, an alkyl group, an aryl group, and a combination thereof;
$R^2$ is selected from an alkyl group, an aryl group, a combination thereof, and a $R^f$—Y—$(CH_2)_x$ group;
$R_f$ is a perfluorinated alkyl group;
Y is selected from: —S(O)$_2$—N(CH$_3$)—, —S(O)$_2$—N(CH$_2$CH$_3$)—, —S(O)$_2$—O—, —S(O)$_2$—, —C(O)—, —C(O)—S—, —C(O)—O—, —C(O)—NH—, —C(O)—N(CH$_3$)—, —C(O)—N(CH$_2$CH$_3$)—, —(CH$_2$CH$_2$O)$_y$—, —O—, and —O—C(O)—CH=CH—C(O)—O—;
n is an integer of greater than 2;
x is an integer of at least 2;
y is an integer of at least 1.

Suitable oxazoline copolymers are described in US 2015/0307718 A1.

Other polymers can be used to improve the grease removal performance of the liquid composition due to the specific sudsing/foaming characteristics they provide to the composition, or adhesion prevention. Suitable polymers for use herein are disclosed in EP patent application EP2272942 (09164872.5) and granted European patent EP2025743 (07113156.9). Suitable polymers include: vinylpyrrolidone homopolymer (PVP); polyethyleneglycol dimethylether (DM-PEG); a vinylpyrrolidone/dialkylaminoalkyl acrylate or methacrylate copolymers; a polystyrenesulphonate polymer (PSS); a poly vinyl pyridine-N-oxide (PVNO); a polyvinylpyrrolidone/vinylimidazole copolymer (PVP-VI); a polyvinylpyrrolidone/polyacrylic acid copolymer (PVP-AA); a polyvinylpyrrolidone/vinylacetate copolymer (PVP-VA); a polyacrylic polymer or polyacrylicmaleic copolymer; and a polyacrylic or polyacrylic maleic phosphono end group copolymer; and mixtures thereof.

The antimicrobial hard surface cleaning composition may comprise from 0.005% to 5.0% by weight of the total composition of the polymer, preferably from 0.10% to 4.0%, more preferably from 0.1% to 3.0% and most preferably from 0.20% to 2.0%, especially for ready-to-use compositions.

Other Optional Ingredients:

Chelating agent: The antimicrobial hard surface cleaning composition can comprise a chelating agent or crystal growth inhibitor. Suitable chelating agents, in combination with the surfactant system, improve the shine benefit. Chelating agent can be incorporated into the compositions in amounts ranging from 0.05% to 5.0% by weight of the total composition, preferably from 0.1% to 3.0%, more preferably from 0.2% to 2.0% and most preferably from 0.2% to 0.4%.

Suitable phosphonate chelating agents include ethylene diamine tetra methylene phosphonates, and diethylene triamine penta methylene phosphonates (DTPMP), and can be present either in their acid form or as salts.

A preferred biodegradable chelating agent for use herein is ethylene diamine N,N'-disuccinic acid, or alkali metal, or alkaline earth, ammonium or substitutes ammonium salts thereof and mixtures thereof, for instance, as described in U.S. Pat. No. 4,704,233. A more preferred biodegradable chelating agent is L-glutamic acid N,N-diacetic acid (GLDA) commercially available under tradename Dissolvine 47S from Akzo Nobel.

Suitable amino carboxylates include ethylene diamine tetra acetates, diethylene triamine pentaacetates, diethylene triamine pentaacetate (DTPA), N-hydroxyethylethylenediamine triacetates, nitrilotriacetates, ethylenediamine tetrapropionates, triethylenetetraaminehexa-acetates, ethanoldiglycines, and methyl glycine diacetic acid (MGDA), both in their acid form, or in their alkali metal, ammonium, and substituted ammonium salt forms. Particularly suitable amino carboxylate to be used herein is propylene diamine tetracetic acid (PDTA) which is, for instance, commercially available from BASF under the trade name Trilon FS® and methyl glycine di-acetic acid (MGDA). Most preferred aminocarboxylate used herein is diethylene triamine pentaacetate (DTPA) from BASF. Further carboxylate chelating agents for use herein include salicylic acid, aspartic acid, glutamic acid, glycine, malonic acid and mixtures thereof.

Fatty acids are less preferred since they can affect the performance of many antimicrobial agents. If present, the fatty acid is preferably present at low levels of less than 0.5 wt % and can include the alkali salts of a $C_8$-$C_{24}$ fatty acid. Such alkali salts include the metal fully saturated salts like sodium, potassium and/or lithium salts as well as the ammonium and/or alkylammonium salts of fatty acids, preferably the sodium salt. Preferred fatty acids for use herein contain from 8 to 22, preferably from 8 to 20 and more preferably from 8 to 18 carbon atoms. Suitable fatty acids may be selected from caprylic acid, capric acid, lauric acid, myristic acid, palmitic acid, stearic acid, oleic acid, and mixtures of fatty acids suitably hardened, derived from natural sources such as plant or animal esters (e.g., palm oil, olive oil, coconut oil, soybean oil, castor oil, tallow, ground oil, whale and fish oils and/or babassu oil. For example coconut fatty acid is commercially available from KLK OLEA under the name PALMERAB1211.

Typically, the antimicrobial hard surface cleaning composition may comprise up to 6.0% by weight of the total composition of said fatty acid, preferably from 0.1% to 3.0%, more preferably from 0.1% to 2.0% and most preferably from 0.15% to 1.5% by weight of the total composition of said fatty acid.

Typically, the antimicrobial hard surface cleaning composition may comprise up to 2.0% by weight of the total composition of said branched fatty alcohol, preferably from 0.10% to 1.0%, more preferably from 0.1% to 0.8% and most preferably from 0.1% to 0.5%.

Further solvent: The liquid compositions of the present invention may comprise solvent and mixtures thereof as a preferred optional ingredient.

Suitable further solvent can be selected from the group consisting of: aliphatic alcohols having from 1 to 6 carbon atoms, ethers and diethers having from 4 to 14 carbon atoms; glycol ether solvents including but not limited to such as ethylene glycol n-hexyl ether, propylene glycol n-butyl ether, and the like; alkoxylated aromatic alcohols; aromatic alcohols; alkoxylated aliphatic alcohols; aliphatic alcohols; $C_8$-$C_{14}$ alkyl and cycloalkyl hydrocarbons and halohydrocarbons; terpenes; and mixtures thereof. Ethers such as n-butoxypropanol ether are particularly preferred.

When present, the further solvent can be present at a level of from 0.1 wt % to 10 wt %, or 0.2 wt % to 5 wt %, or 0.5 wt % to 3 wt %.

Essential Oils: Suitable essential oils or actives thereof include those essential oils which exhibit some antimicrobial properties. By "actives of essential oils" it is meant any ingredient of essential oils that exhibits some antimicrobial properties. Essential oils and actives thereof may also provide a desirable odor profile. Suitable essential oils include, but are not limited to, those obtained from thyme, lemongrass, citrus, lemons, oranges, anise, clove, aniseed, cinnamon, geranium, roses, mint, lavender, citronella, eucalyptus, peppermint, camphor, sandalwood, cedar, and mixtures thereof. Actives of essential oils include, but are not limited to, thymol (present, for example, in thyme), eugenol (present, for example, in cinnamon and clove), menthol (present, for example, in mint), geraniol (present, for example, in geranium and rose), verbenone (present, for example, in vervain), eucalyptol and pinocarvone (present in eucalyptus), cedrol (present, for example, in cedar), anethol (present, for example, in anise), carvacrol, hinokitiol, berberine, terpineol, limonene, and mixtures thereof. The compositions disclosed herein may comprise thymol. Thymol is commercially available, for example, from Sigma Aldrich.

Further optional ingredients: The antimicrobial hard surface cleaning compositions may comprise a variety of other optional ingredients depending on the technical benefit aimed for and the surface treated. Suitable optional ingredients for use herein include perfume, builders, buffers, hydrotropes, colorants, stabilisers, radical scavengers, abrasives, soil suspenders, brighteners, anti-dusting agents, dispersants, dye transfer inhibitors, pigments, silicones and/or dyes.

Wipe or Pad

The present invention also relates to an article of manufacture comprising said composition, wherein the composition is comprised in a spray dispenser, or in a wipe or pad. The composition can be comprised on a wipe or pad. Such wipes and pads can be suitable for treating hard surfaces, such as found in the household, and the like. Suitable wipes can be fibrous. Suitable fibrous wipes can comprise polymeric fibres, cellulose fibres, and combinations thereof. Suitable cellulose-based wipes include kitchen wipes, and the like. Suitable polymeric fibres include polyethylene, polyester, and the like. Polymeric fibres can be spun-bonded to form the wipe. Methods for preparing thermally bonded fibrous materials are described in U.S. application Ser. No. 08/479,096 (Richards et al.), filed Jul. 3, 1995 (see especially pages 16-20) and U.S. Pat. No. 5,549,589 (Horney et al.), issued Aug. 27, 1996 (see especially Columns 9 to 10). Suitable pads include foams and the like, such as HIPE-derived hydrophilic, polymeric foam. Such foams and methods for their preparation are described in U.S. Pat. No. 5,550,167 (DesMarais), issued Aug. 27, 1996; and commonly assigned U.S. patent application Ser. No. 08/370,695 (Stone et al.), filed Jan. 10, 1995.

Method of Cleaning a Surface:

The antimicrobial hard surface cleaning compositions described herein are particularly suited for cleaning surfaces selected from the group consisting of: ceramic tiles, enamel, stainless steel, Inox®, Formica®, vinyl, no-wax vinyl, linoleum, melamine, glass, plastics and plastified wood, and combinations thereof. In particular, the compositions are particularly suited for reducing or removing antimicrobial activity from the surface, and for cleaning when the composition further comprises an amine oxide surfactant, other nonionic surfactant, and mixtures thereof.

For general cleaning, especially of floors and countertops, the preferred method of cleaning comprises the steps of:
a) optionally diluting the hard surface cleaning composition of the present invention;
b) applying the hard surface cleaning composition to a hard surface;
c) leaving the surface to dry, without wiping or rinsing the surface.

The antimicrobial hard surface cleaning composition may be diluted to a level of from 0.1% to 2.0%, or from 0.3% to 1.5% by volume. The antimicrobial hard surface cleaning composition may be diluted to a level of from 0.4% to 0.6% by volume, especially where the antimicrobial hard surface cleaning composition has a total surfactant level of greater than or equal to 5% by weight. Where the antimicrobial hard surface cleaning composition has a total surfactant level of less than 5% by weight, the antimicrobial hard surface cleaning composition may be diluted to a level of from 0.7% to 1.4% by volume. In preferred embodiments, the antimicrobial hard surface cleaning composition is diluted with water.

The dilution level is expressed as a percent defined as the fraction of the antimicrobial hard surface cleaning composition, by volume, with respect to the total amount of the diluted composition. For example, a dilution level of 5% by volume is equivalent to 50 ml of the antimicrobial hard surface cleaning composition being diluted to form 1000 ml of diluted composition.

The diluted composition can be applied by any suitable means, including using a mop, sponge, cloth, or other suitable implement.

Alternatively, the antimicrobial hard surface cleaning composition can be a "ready-to-use" composition, where dilution is not necessary. Such ready-to-use compositions can be comprised in a spray container.

In addition, for particularly dirty or greasy spots, or spots which have been contacted by microbes, the antimicrobial hard surface cleaning compositions, can be applied neat to the hard surface. When amine oxide and a further non-ionic surfactant is present, the composition provides improves penetration and removal of the stain, and especially of greasy stains, leading to improved surfactancy action and stain removal, as well as improved hygiene.

By "neat", it is to be understood that the liquid composition is applied directly onto the surface to be treated without undergoing any significant dilution, i.e., the liquid composition herein is applied onto the hard surface as described herein, either directly or via an implement such as a sponge, without first diluting the composition. By "without undergoing any significant dilution", what is meant is that the composition is diluted by less than 10 wt %, preferably less than 5 wt %, more preferably less than 3 wt %. Such dilutions can arise from the use of damp implements to apply the composition to the hard surface, such as sponges which have been "squeezed" dry.

In another preferred embodiment of the present invention said method of cleaning a hard surface includes the steps of applying, preferably spraying, said liquid composition onto said hard surface, leaving said liquid composition to act onto said surface for a period of time to allow said composition to act, with or without applying mechanical action.

Methods:

A) pH Measurement:

The pH is measured on the neat composition, at 25° C., using a Sartarius PT-10P pH meter with gel-filled probe (such as the Toledo probe, part number 52 000 100), calibrated according to the instructions manual.

B) Shine:

Experiments to evaluate surface residues (i.e. shine performance) of the antimicrobial formulations were conducted using the following procedure. A clean, dry, glossy, black ceramic tile (20 cm×30 cm) was used as a representative hard surface. 0.5 mL of the ready-to-use antimicrobial formulation was applied diagonally across the tile surface from bottom left to top right to create a continuous liquid deposit on the tile. The liquid deposit was then wiped across the tile using a damp cotton cloth (8 cm×10 cm folded into quarters) using a pattern of ×8 wipes horizontally (back and forth), ×10 wipes vertically (up and down) and ×8 wipes horizontally (back and forth). This wiping regime was conducted in a single continuous motion without lifting the cloth from the tile. The tile was then allowed to dry for 20 minutes. Panelists were then asked to grade the severity of residues on the tile according to the following scale:

0=No streaks

1=Very slight streaks

2=Slight streaks

3=Slight to moderate streaks

4=Moderate streaks

5=Moderate to heavy streaks

6=Heavy streaks

At least 8 panelists evaluated each tile. Mean streak gradings were compared using Dunnett's statistical test with nil solvent as the control, unless specified otherwise.

EXAMPLES

Examples of ready-to-use compositions of the present invention are shown in Table 1. The compositions were made by mixing the components together, either as ready-to-use concentrations directly, or by first preparing a concentrated composition and then diluting in de-ionized water, such as a 1:10 dilution, to achieve the ready-to-use composition. The concentration of each component in a given composition corresponds to the weight of the component, provided on an active basis, as a percent of the total weight composition. The hydrogen peroxide is preferably added last to avoid any unintentional chemical reaction.

TABLE 1

Example ready-to-use composition (active weight %)

| | Ex. 1 | Ex. 2 | Ex. 3 | Ex. 4 | Ex. 5 | Ex. 6 | Ex. 7 |
|---|---|---|---|---|---|---|---|
| Sodium octyl sulphate | 0.15 | 0.15 | 0.15 | 0.6 | 0.6 | 0.15 | 0.15 |
| N,N-dimethyl octanamide N,N-dimethyl decanamide (55:45) | 0.20 | 0.20 | 0.20 | 0.6 | 0.6 | 0.20 | 0.20 |

TABLE 1-continued

Example ready-to-use composition (active weight %)

| | Ex. 1 | Ex. 2 | Ex. 3 | Ex. 4 | Ex. 5 | Ex. 6 | Ex. 7 |
|---|---|---|---|---|---|---|---|
| Succinic acid | 0.20 | 0.20 | 0.20 | 0.5 | 0.5 | 0.20 | 0.20 |
| Octanoic acid | 0.16 | 0.16 | 0.16 | — | — | 0.16 | 0.16 |
| Sodium hydroxide | 0.1 | 0.1 | 0.1 | — | 0.1 | 0.1 | 0.1 |
| Hydrogen peroxide | 0.5 | 0.5 | 0.5 | 0.45 | 0.45 | 0.5 | 0.5 |
| Decyl dimethyl amine oxide | — | — | — | — | — | 0.5 | — |
| Poly (2-ethyl-2-oxazoline) | — | — | 0.5 | — | — | — | — |
| Propylene glycol | 0.5 | — | 0.5 | — | — | 0.5 | 2.0 |
| 1,3 Butylene glycol | — | 0.5 | — | 2.0 | 2.0 | — | — |
| Deionized water | to 100 | to 100 | to 100 | to 100 | to 100 | to 100 | to 100 |

Table 2 shows the shine performance of a composition based on 0.15% sodium octyl sulphate, 0.2% N,N-dimethyl octanamide/N,N-dimethyl decanamide (55:45), 0.2% succinic acid, 0.16% octanoic acid, 0.1% sodium hydroxide and 0.5% hydrogen peroxide, with the addition of different solvents at 2%, and water to 100% by weight:

TABLE 2

Shine performance for a non-polymer composition with solvent addition

| Solvent addition (2%) | Mean streak grade | Difference | p value |
|---|---|---|---|
| Nil solvent (control) | 4.7 | (ref) | (ref) |
| Glycerol | 4.3 | −0.4 | 0.3855 |
| Isopropyl alcohol | 4.3 | −0.4 | 0.3855 |
| Diethylene glycol monoethyl ether* | 3.2 | −1.5 | <0.0001 |
| Dipropylene glycol butyl ether* | 2.4 | −2.3 | <0.0001 |
| 1,2 butylene glycol | 1.9 | −2.8 | <0.0001 |
| Dipropylene glycol | 2.0 | −2.7 | <0.0001 |
| Ethylene glycol | 1.4 | −3.3 | <0.0001 |
| Diethylene glycol | 1.5 | −3.2 | <0.0001 |
| Propylene glycol | 1.5 | −3.2 | <0.0001 |
| 1,3 butylene glycol | 0.6 | −4.1 | <0.0001 |

*comparative

Table 3 shows the shine performance of a composition based on 0.15% sodium octyl sulphate, 0.2% N,N-dimethyl octanamide/N,N-dimethyl decanamide (55:45), 0.2% succinic acid, 0.16% octanoic acid, 0.1% sodium hydroxide, 0.5% hydrogen peroxide and 0.5% poly(2-ethyl-2-oxazoline), with the addition of different solvents at 2%, and water to 100% by weight:

TABLE 3

Shine performance for a polymer-containing composition with solvent addition

| Solvent addition (2%) | Mean streak grade | Difference | p value |
|---|---|---|---|
| Nil solvent (control) | 5.5 | / | / |
| Propylene glycol | 4.7 | −0.8 | 0.0082 |
| Diethylene glycol | 3.5 | −2.0 | <0.0001 |
| Ethylene glycol | 3.0 | −2.5 | <0.0001 |
| 1,3 butylene glycol | 2.8 | −2.7 | <0.0001 |

Table 4 shows the shine performance of an amine oxide-containing composition based on 0.15% sodium octyl sulphate, 0.2% N,N-dimethyl octanamide/N,N-dimethyl decanamide (55:45), 0.2% succinic acid, 0.16% octanoic acid, 0.1% sodium hydroxide, 0.5% decyl dimethyl amine oxide and 0.5% hydrogen peroxide with the addition of propylene glycol at 0.5%, and water to 100% by weight:

TABLE 4

Shine performance for an amine oxide containing composition with solvent addition

| Solvent addition (0.5%) | Mean streak grade | Difference | p value |
|---|---|---|---|
| Nil solvent (control) | 5.2 | / | / |
| Propylene glycol | 1.8 | −3.4 | <0.0001 |

Ceramic tiles used in shine evaluations described above were subsequently imaged using an optical microscope in bright-field mode. The size of the crystal residues was then measured digitally using ImageJ software. Five fields of view were taken for each tile, and 30 measurements per field of view were captured. Data was analysed using Dunnett's statistical test using nil solvent as the control.

Table 5 shows the mean residue crystal size for a composition based on 0.15% sodium octyl sulphate, 0.2% N,N-dimethyl octanamide/N,N-dimethyl decanamide (55:45), 0.2% succinic acid, 0.16% octanoic acid, 0.1% sodium hydroxide and 0.5% hydrogen peroxide, with the addition of propylene glycol, and water to 100% by weight.

TABLE 5

Particle size analysis of surface crystal deposits with propylene glycol addition

| Propylene glycol addition (%) | Mean particle size (μm) | Difference (μm) | p value |
|---|---|---|---|
| Nil solvent (control) | 318.8 | / | / |
| 0.25 | 47.8 | −271.0 | <0.0001 |
| 0.5 | 34.3 | −284.5 | <0.0001 |
| 1.0 | 27.9 | −290.9 | <0.0001 |
| 2.0 | 26.4 | −292.4 | <0.0001 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean " 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An antimicrobial hard surface cleaning composition comprising:
   a. from about 0.03% to about 10%, by weight of the composition, of a detersive surfactant;
   b. from 0.05% to 8%, by weight of the composition, of an antimicrobial agent;
   c. from about 0.1% to about 2.0%, by weight of the composition, of an amide of formula I:

   $$R^1-CO-NR^2R^3 \quad (I)$$

wherein $R^1$ is selected from the group consisting of linear or branched, substituted or unsubstituted $C_6$-$C_{12}$, each of $R^2$ and $R^3$ is independently selected from H, OH, a halogen, or $C_1$-$C_6$ linear or branched, substituted or unsubstituted hydrocarbyl groups;
   d. from about 0.1% to about 1.0%, by weight of the composition, of a glycol solvent, wherein the glycol solvent is selected from the group consisting of $C_1$-C6 diols, $C_1$-C6 triols, and mixtures thereof;
   e. water; and
   said composition has a pH from about 1.0 to about 6.0, wherein the antimicrobial agent is hydrogen peroxide, wherein the detersive surfactant comprises from 6 to 12 carbon atoms in the primary carbon chain.

2. The composition according to claim 1, wherein the glycol solvent is selected from the group consisting of propylene glycol, dipropylene glycol, glycerin, 1,3 butylene glycol, ethylene glycol, diethylene glycol, triethylene glycol and mixtures thereof.

3. The composition according to claim 1, wherein the amide of formula I is selected from the group consisting of N,N-dimethyl octanamide, N,N-dimethyl decanamide, N,N-dimethyl 9-decenamide, N,N-dimethyl 7-octenamide, octanohydroxamic acid, and mixtures thereof.

4. The composition according to claim 1, wherein the composition further comprises amine oxide surfactant at a level of from about 0.01% to about 9.5% by weight of the composition.

5. The composition according to claim 4, wherein the composition further comprises amine oxide surfactant at a level of from about 0.01% to about 2.0% by weight of the composition.

6. The composition according to claim 1, wherein the composition comprises an acidifying agent, wherein the acidifying agent is selected from the group consisting of: organic acid, inorganic acid, and mixtures thereof.

7. The composition according to claim 1, wherein the composition further comprises a polymer selected from the group consisting of: oxazoline homopolymer, oxazoline, copolymer, vinylpyrrolidone homopolymer (PVP);
   polyethyleneglycol dimethylether (DM-PEG); a vinylpyrrolidone/dialkylaminoalkyl acrylate or methacrylate copolymers; a polystyrenesulphonate polymer (PSS); a poly vinyl pyridine-N-oxide (PVNO);
   a polyvinylpyrrolidone/vinylimidazole copolymer (PVP-VI); a polyvinylpyrrolidone/polyacrylic acid copolymer (PVP-AA); a polyvinylpyrrolidone/vinylacetate copolymer (PVP-VA); a polyacrylic polymer or polyacrylicmaleic copolymer; and a polyacrylic or polyacrylic maleic phosphono end group copolymer; and mixtures thereof.

8. The composition according to claim 7, wherein the composition comprises the polymer at a level of from about 0.005% to about 5.0% by weight of the total composition of the polymer.

9. A method for cleaning a hard surface, comprising the steps of:
   a. optionally diluting the hard surface cleaning composition according to claim 1;
   b. applying the hard surface cleaning composition to a hard surface; leaving the hard surface to dry without rinsing the surface.

* * * * *